W. S. HANCOCK.
Broom.
No. 159,409.          Patented Feb. 2, 1875.
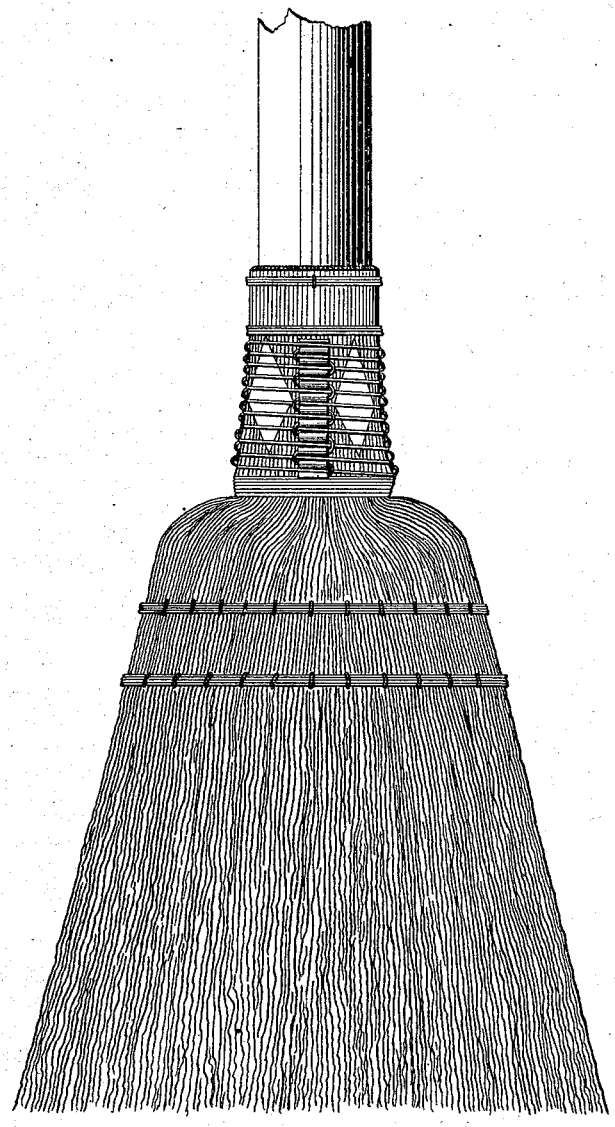

UNITED STATES PATENT OFFICE.

WILLIAM S. HANCOCK, OF ENGLEWOOD, ILLINOIS.

IMPROVEMENT IN BROOMS.

Specification forming part of Letters Patent No. 159,409, dated February 2, 1875; application filed December 31, 1874.

*To all whom it may concern:*

Be it known that I, WILLIAM S. HANCOCK, of Englewood, in the county of Cook and in the State of Illinois, have invented certain new and useful Improvements in Brooms; and do hereby declare that the following is a full, clear, and exact description thereof, reference being had to the accompanying drawings, and to the letters of reference marked thereon, making a part of this specification.

The nature of my invention consists in coloring broom-corn, or brooms made of broom-corn, as will be hereinafter more fully set forth.

In order to enable others skilled in the art to which my invention appertains to use the same, I will now proceed to describe how the same may be carried out.

My idea is to color broom-corn in different colors to designate different qualities. For instance, green and red, or any other colors desired.

For coloring green, I use a dye composed of methyl-green crystal, indigo, carmine, picric-acid crystal, and alum, in about equal parts, dissolved in water.

For coloring red, I use a dye composed of red aniline and alum, in about equal parts, dissolved in water.

But I do not confine myself to these ingredients, as other coloring materials may, perhaps, be used.

The broom-corn may be colored the desired color before being worked into brooms, or it may be first worked up and colored afterward, whichever may be deemed most desirable.

The main or principal advantages of this invention are substantially as follows: It preserves the corn, particularly after being made into brooms, from being cut or eaten by rats and mice. Great destruction of broom-corn is caused by these vermin, and bleaching by sulphur or brimstone in no way hinders them. Hundreds of dollars of damage to a stock of brooms, or broom-corn, is frequently caused by these vermin in a few hours. Rats and mice will not eat broom-corn colored as I propose to do. Another and far greater advantage, and which is of paramount importance, is the advantage to the health of the worker in broom-corn by the absence of the smoke of sulphur or brimstone, which is always used in the old process. The fumes of sulphur are deadly in their effects on weak lungs, and many a broom-maker has been obliged to leave the business in order to preserve his life. My invention entirely does away with this dangerous ingredient.

A substantial advantage is secured to the grower of broom-corn. Broom-corn is graded in price by color—green being the highest standard, and other colors, such as pale, white, or red, are lower in price. No corn can be green in color, naturally, which has been allowed to ripen in the field, and consequently no crop of broom-corn seed can be secured if the corn is harvested early enough to preserve the green color. The crop of seed of broom-corn, when ripened, is worth as much as oats, bushel for bushel, and the yield is much more abundant than oats; and hence the advantage of securing a crop of seed, which could invariably be done if my invention were applied to the corn, which would render ripe brush as marketable as green corn. Then the cost of harvesting would be much less if the corn were allowed to ripen.

There are still other advantages, such as improved appearance of the brooms, which renders them more saleable, &c.

Having thus fully described my invention, what I claim as new, and desire to secure by Letters Patent, is—

A broom made from broom-corn, colored by dyeing, as set forth.

In testimony that I claim the foregoing I have hereunto set my hand this 30th day of November, 1874.

WILLIAM S. HANCOCK.

Witnesses:
 C. L. EVERT,
 J. W. SALLEDY.